Figure 1:
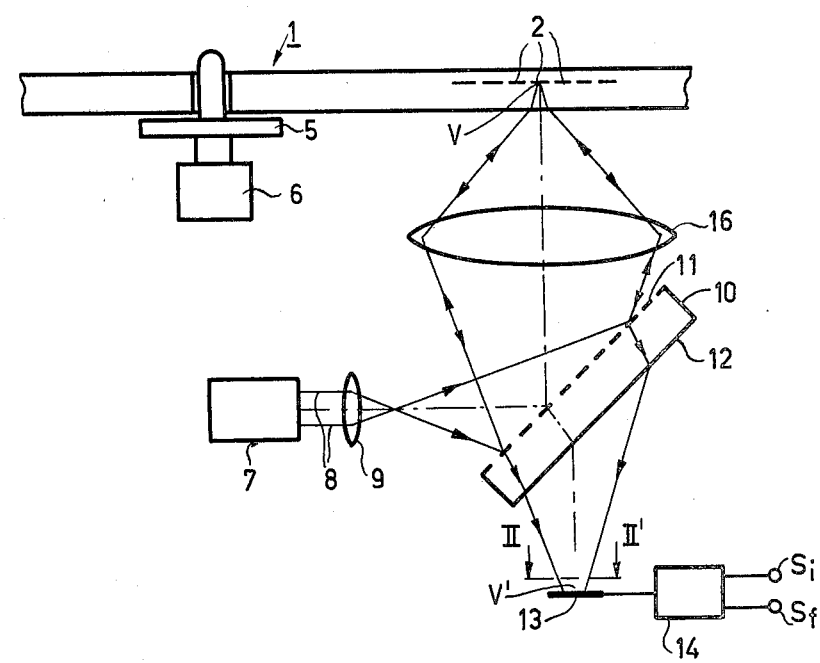

United States Patent [19]

Heemskerk et al.

[11] 4,358,200
[45] Nov. 9, 1982

[54] OPTICAL FOCUSSING-ERROR DETECTION SYSTEM

[75] Inventors: Jacobus P. J. Heemskerk; Hendrik Renes; Carel A. J. Simons, all of Eindhoven, Netherlands

[73] Assignee: U.S. Philips Corporation, New York, N.Y.

[21] Appl. No.: 109,732

[22] Filed: Jan. 4, 1980

[30] Foreign Application Priority Data

Sep. 28, 1979 [NL] Netherlands .......................... 7907216

[51] Int. Cl.³ .............................................. G01J 1/36
[52] U.S. Cl. ..................................... 356/123; 350/170; 350/172; 350/162 R; 369/45
[58] Field of Search ...................... 358/128.5; 369/45; 356/123; 350/170, 173, 286, 3.7, 3.72, 447

[56] References Cited

U.S. PATENT DOCUMENTS

| | | | |
|---|---|---|---|
| 2,579,177 | 12/1951 | Miles | 350/173 |
| 2,664,024 | 12/1953 | Hansen | 350/447 |
| 2,896,499 | 7/1959 | DeLang | 350/447 |
| 3,669,673 | 6/1972 | Ih et al. | 350/162 R |
| 4,011,400 | 3/1977 | Simons et al. | 358/127 |
| 4,025,949 | 5/1977 | Whitman | 369/45 |
| 4,123,652 | 10/1978 | Bouwhuis | 369/45 |
| 4,163,149 | 7/1979 | Sawano et al. | 369/45 |
| 4,196,961 | 4/1980 | Walter et al. | 350/447 |
| 4,287,413 | 9/1981 | Kanamaru | 369/45 |

*Primary Examiner*—R. A. Rosenberger
*Attorney, Agent, or Firm*—Thomas A. Briody; Robert T. Mayer; Algy Tamoshunas

[57] ABSTRACT

A focussing error detection system is described for determining deviations between the plane of imaging of an objective system in an optical arrangement and the radiation-reflecting surface in said system. The apparatus comprises an optical element by means of which a radiation beam coming from the radiation reflecting surface is both rendered astigmatic and separated from a radiation beam which is directed to the radiation-reflecting surface. By the use of this element the number of components of the focussing-error detection system can be minimized and a compact construction of said system can be obtained.

15 Claims, 7 Drawing Figures

OPTICAL FOCUSSING-ERROR DETECTION SYSTEM

The invention relates to an optical focussing-error detection system for determining deviations between the image plane of an objective system in an optical system and a radiation-reflecting surface on which an image is to be formed. Such a focussing-error detection system comprises a radiation source, the objective system, a beam-deflecting element for separating the radiation reflected by the radiation-reflecting surface from a radiation beam emitted by the radiation source, an astigmatism-introducing element, and a radiation-sensitive detector comprising four subdetectors.

Such a focussing-error detection system may be employed in an apparatus for reading a record carrier with an optically readable radiation-reflecting information structure in order to keep the read beam in focus on the information structure.

Such an apparatus is known, inter alia from Netherlands Patent Application No. 77 03076, which has been laid open to public inspection. This apparatus is for example used for reading a record carrier on which a video program or an audio program is stored. The information structure comprises a multitude of information areas which, in the track direction, alternate with intermediate areas. The areas may, for example, be arranged in a spiral track. The information areas have a different influence on a read beam than the intermediate areas. The information may be encoded in the frequency of the information areas and/or the ratio of the lengths of said areas relative to those of the intermediate areas. The information, may also be encoded in digital form. In addition to video and audio information the record carrier may be used for the storage of digital information, for example supplied by or to a computer.

In order to obtain a relatively long playing time with a record carrier of limited size, the details of the information structure have to be very small. For example, if a thirty-minute video program is stored on one side of a disc in an annular area with an outer radius of approximately 15 centimeters and an inner radius of approximately 6 centimeters, the width of the tracks will be approximately 0.6 microns and the average length of the information areas will be approximately one micron.

In order to enable such small details to be read, an objective system with a comparatively large numerical aperture is required. However, the depth of focus of such an objective system is small. Since in the read apparatus variations in the distance between the plane of the information structure and the objective system may be greater than the depth of focus, such variations must be detected and the focussing corrected in response thereto.

As described in Netherlands Patent Application No. 77 03076, this may be done by rendering the read beam coming from the record carrier astigmatic for example, a cylindrical lens. Arranged between the focal lines of the astigmatic system formed by the objective system and the cylindrical lens is a radiation-sensitive detector comprising four subdetectors. In the case of a variation in the position of the plane of the information structure relative to the objective system, the shape of the image spot formed on the composite detector will change. This change in shape can be detected by suitably combining the output signals of the subdetectors.

The focussing error detection system described in Netherlands Patent Application No. 77 03076 can be used not only in apparatus for reading a radiation-reflecting record carrier, but also in general in optical systems in which deviations between the desired and the actual position of a radiation-reflecting surface on which an image is to be formed are to be detected. Examples of this are microscopes, systems for projecting a mask on a substrate used in the manufacture of integrated circuits, etc.

In such a focussing-error detection system, the radiation which is reflected by the radiation-reflecting surface and which passes through the objective system, should be directed to a radiation-sensitive detector. For this purpose the known detection system employs a separate beam splitter, such as a semitransparent mirror or a polarization-sensitive splitting prism.

It is an object of the present invention to provide a focussing-error detection system which is as compact as possible and which comprises a minimal number of optical components. The focussing-error detection system in accordance with the invention is therefore characterized in that in the radiation path between the radiation source and the objective system there is included an optical element which introduces astigmatism solely in the radiation beam which has been reflected by the radiation-reflecting surface and which also diverts said beam from said radiation path and to the composite detector.

A first embodiment of the detection system in accordance with the invention is further characterized in that said optical element is constituted by a diffraction grating with a linearly varying grating period.

A second embodiment of the detection system in accordance with the invention is further characterized in that said optical element comprises a plate of a transparent material, whose two surfaces are inclined relative to the principal axis of the read beam and one of the surfaces is partly reflecting. The two surfaces of the plate are those surfaces on which the radiation beam impinges.

The radiation beam is a non-parallel beam. The substrate of the plate constitutes an astigmatic element for this beam.

The plate may be a plane-parallel plate. A preferred embodiment of an apparatus in accordance with the invention, however, is characterized in that the plate is wedge-shaped.

By suitably selecting the wedge-angle, the degree of astigmatism can be adjusted, but more importantly, also its orientation. The orientation of the astigmatism may be selected so that the astigmatic focal lines are oriented at angles of 45° to the effective track direction. The effective track direction is the direction of the information track being scanned, as imaged on the composite detector. In that case, the focussing-error signal is hardly influenced by displacements of the read spot in the direction transverse to the track direction. In a focussing-error detection system in which the radiation reflected by the radiation-reflecting surface should pass through the second surface of the plate, the use of the wedge-shape moreover ensures that undesired reflections by the second surface are not annoying.

The apparatus in accordance with the invention may further be characterized in that the second surface of said plate is radiation-reflecting. The advantage of this embodiment is that the tolerance in respect of the tilt of the plate is substantially greater.

Furthermore, the apparatus in accordance with the invention may be characterized in that the partly reflecting surface of the plate is a polarization-sensitive splitting mirror. In this embodiment the available radiation intensity is utilized in an optimum manner, while the amount of radiation which returns to the source after reflection from the radiation-reflection surface is minimized. This last-mentioned fact may be of importance in an apparatus for reading an optical record carrier.

Figure 2:
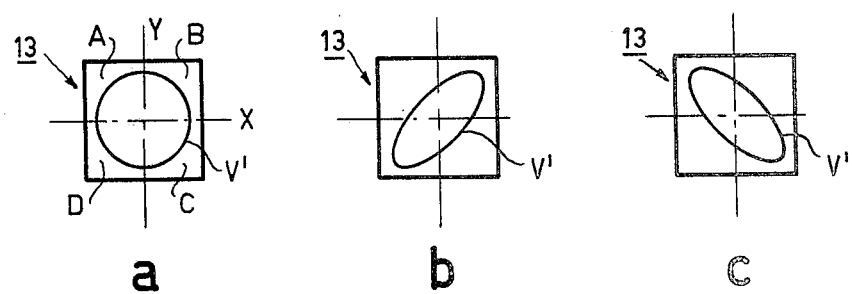
Figure 3:
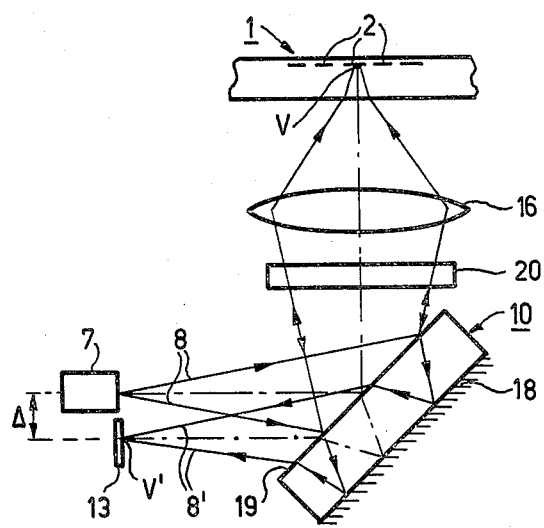
Figure 4:
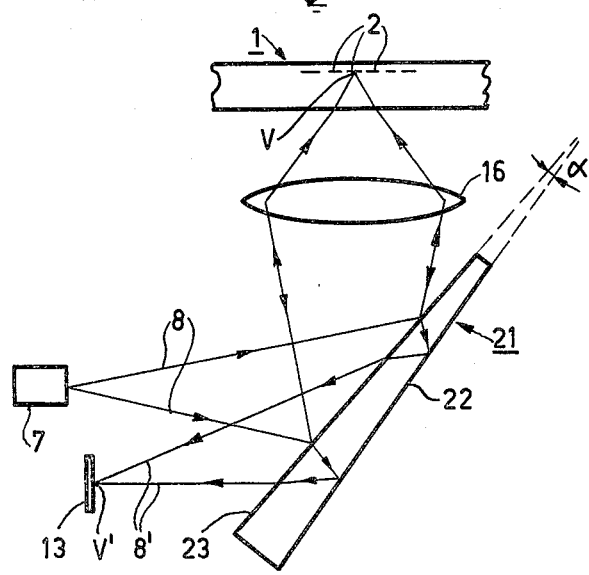
Figure 5:
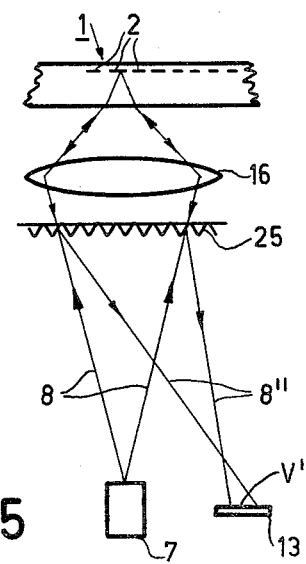

The invention will now be explained by describing its use in an apparatus for reading a record carrier, reference being made to the drawing wherein:

FIG. 1 shows an embodiment of a read apparatus in accordance with the invention with a plane-parallel plate which is reflecting on one side, FIGS. 2a, 2b and 2c show the changing shape of the image spot on the composite detector as a function of the focussing, FIG. 3 shows a part of an embodiment of a read apparatus with a plane-parallel plate which is reflecting on two sides, FIG. 4 shows a part of an embodiment of a read apparatus with a wedge-shaped plate, FIG. 5 shows a part of an embodiment of a read apparatus with a diffraction grating. In these Figures corresponding elements bear the same reference numerals.

FIG. 1 shows a round disc-shaped record carrier 1 in radial cross-section. The information structure is represented by the information tracks 2. The record carrier is illuminated by a read beam 8 coming from the radiation source 7. This radiation source may be a laser, for example, a gas laser, such as a He-Ne laser, or a semiconductor diode laser, such as an AlGaAs laser. An objective system, which for simplicity is represented by a single lens 16, focusses the read beam to a read spot V in the plane of the information tracks 2. The focal distance of an auxiliary lens 9, if any, has been selected so that the pupil of the objective system is adequately filled, so that the read spot has the diffraction-limited size corresponding to the numerical aperture of the objective system. The read beam is reflected by the record carrier, and if the record carrier is rotated with the aid of the turntable 5 which is driven by the motor 6, it is modulated in accordance with the information which is stored in a track portion to be read.

In order to separate the incident unmodulated beam and the reflected modulated beam a beam splitter, for example in the form of a semitransparent mirror 11, is included in the radiation path. This beam splitter reflects part of the radiation emitted by the source to the record carrier and transmits a part of the radiation reflected by the record carrier to a radiation-sensitive information detector 13. This detector is connected to an electronic circuit 14 in which in known manner, which is not discussed in more detail in the present Application, a high-frequency information signal $S_i$ and, as will be explained hereinafter, a focussing error signal $S_f$ of lower frequency and, as the case may be, a tracking signal also having a lower frequency, are derived. In order to obtain the focussing-error signal, the beam which has been reflected by the information structure should be rendered astigmatic.

In accordance with the invention, the functions of beam splitter and astigmatism-introducing element are performed by a single element. As is shown in FIG. 1 said element may take the form of a plane-parallel plate 10 whose surface 11 is a semitransparent mirror. Since the plate is disposed obliquely in the read beam, it constitutes an astigmatic element for the converging read beam which has been reflected by the record carrier, which element changes the cross-section of this beam. The beam which is directed to the record carrier does not pass through the plate 10 and is thus not made astigmatic. Consequently, the quality of the read spot V on the information structure is not influenced by the plate 10.

The astigmatic system constituted by the objective system 16 and the plate 10 images the read spot V in two astigmatic focal lines, one of which is disposed in the plane of drawing and the second of which is perpendicular to said plane. The distance between the focal lines is determined by the refractive index n and the thickness d of the substrate of the plate 10 and by the angle of incidence i of the principal ray of the read beam. The radiation-sensitive detector 13 is disposed in a plane which, viewed along the optical axis, is situated between the focal lines, preferably at a location where the dimensions, in two mutually perpendicular directions, of the image spot V' associated with the read spot V are as far as possible equal in the case of correct focussing.

In order to enable the shape of the image spot V', and thus the degree of focussing to be determined, the detector 13 comprises four subdetectors, which are arranged in the four quadrants of an X-Y coordinate system. FIGS. 2a, 2b and 2c show a view in accordance with the line II-II' in FIG. 1 of the four subdetectors A, B, C and D. As shown in FIG. 2, the shape of the image spot V' projected on the detector varies depending on the distance between the objective system and the plane of the information tracks. The X and the Y axis are disposed at an angle of 45° with the orientation of the astigmatic focal lines.

FIG. 2a represents the case where the distance between the objective system and the plane of the tracks is correct. If this distance is too large, the focal lines will be situated nearer the plate 10. The detector 13 is then situated nearer a first focal line than the second focal line and the image spot V' has a shape shown in FIG. 2b. If the distance between the objective system and the plane of the tracks is too small, the focal lines are further away from the plates 10, and the second focal line will be nearer the detector 13 than the first focal line. The image spot V' then has a shape as shown in FIG. 2c.

If the signals supplied by the subdetectors A, B, C and D are represented by $S_A$, $S_B$, $S_C$ and $S_D$ respectively, the focussing error signal $S_f$ is given by:

$$S_f = (S_A + S_C) - (S_B + S_D)$$

It will be evident that in the situation of FIG. 2a $S_A + S_C = S_B + S_D$, so that $S_f = 0$. For the situation of FIG 2b and FIG. 2c, $S_f$ is negative and positive respectively. By adding the signals $S_A$ and $S_C$ to each other as well as the signals $S_B$ and $S_D$, and subtracting the sum signals thus obtained from each other, an unambiguous focussing error signal is obtained. This signal can be processed electronically, in a manner known per se, to a focussing control signal by means of which the focussing of the objective system can be corrected, for example by moving the objective system relative to the plane of the information structure with the aid of a moving-coil.

The information signal $S_i$ can be obtained with the aid of the same subdetectors A, B, C and D, for example by adding the signals from the four subdetectors to each other.

The detectors A, B, C and D may also be used for deriving a tracking signal, i.e. a signal which provides an indication of the position of the centre of the read spot V relative to the centre of a track to be read. The tracking signal $S_r$ is then for example given by:

$$S_r = (S_A + S_B) - (S_C + S_D).$$

Instead of using the focussing detection beam and the composite detector 13, the information can also be read with a separate read beam and a separate radiation-sensitive information detector.

If is to be noted that, depending on the embodiment of the read apparatus, further optical elements may be arranged between the plane 10 and the objective system 16, for example a positive lens for making the beam 8 parallel.

On the surface 12 of the plate 10 a reflective layer 18 may be deposited, as is shown in FIG. 3. The read beam 8 then traverses the substrate of the plate 10 two times. The apparatus of FIG. 3 is more compact than that of FIG. 1 and has the great advantage that it is less sensitive to tilting of the plate 10. FIG. 3 and the following Figures only show those elements which are relevant for the present invention.

If the intensity of the read beam is sufficiently high, the surface 11 of the plate 10 in the apparatus of FIGS. 1 and 3 may be a semitransparent mirror. A reduction of the feedback, via the mirror 11, of the modulated read beam to the radiation source is obtained if for the reflection coefficient R of the mirror for example the value 0.3 is selected instead of the value 0.5 In that case, when the reflection and absorption losses at the other optical components in the radiation path are ignored, only 9% of the radiation emitted by the source 7 can be reflected to said source, while 21% of the radiation emitted by the source can reach the detector 13.

When the surface of the plate 10 carries a polarization-sensitive splitting mirror 19 instead of the semitransparent mirror 11, it is achieved that the radiation intensity at the detector 13 is a maximum, whilst the feedback of the radiation reflected to the radiation source by the record carrier is a minimum. Between the polarization-sensitive splitting mirror 19 and the objective system 16 a $\lambda/4$ plate 20 should then be interposed (where $\lambda$ is the wavelength of the radiation beam 8), as is shown in FIG. 3, and the radiation source should emit a linearly polarized radiation beam. The electric field vector, the E-vector, of this beam is perpendicular to the plane of incidence, i.e. the plane of drawing, so that the beam is reflected by the surface 19 and subsequently traverses the $\lambda/4$ plate for a first time. After reflection by the information structure the read beam traverses the $\lambda/4$ plate a second time so that the E-vector of the reflected beam 8' is parallel to the plane of incidence. The beam then passes through the mirror 19 and is reflected to the detector 13 by the layer 18.

The distance $\alpha$ between the principal rays of the incident beam 8 of the returning beam 8' is given by $$\Delta = 2.d. \tan(i'). \cos(i),$$

where d is the thickness of the substrate 10, i the angle of incidence of the beam 8 on the surface 19, and i' the angle of refraction the principal ray of the beam 8' in the substrate 10. The variation $\delta\Delta$ as a result of the variation $\delta i$ in i is then:

$$\delta\Delta = 2.d. \tan(i'). \delta i.$$

In an embodiment of an apparatus in accordance with FIG. 3 i is 45°, the refractive index n of the substrate 10 is 1.5 and d is 3 mm. For a $\delta i$ as a result of assembly inaccuracies and/or a change with time the variation $\delta\Delta$ is approximately 6/µm. This variation is independent of the distance between the radiation source 7 and the mirror 19.

As the returning beam 8' passes through a plane-parallel plate, this beam is subject to a paraxial or longitudinal shift L, which is given by: $L = (n-1)/n \,[2d/\cos(i')]$. It is possible to make L equal to $\Delta$. The radiation source, in the form of a diode laser, and the detector 13 may then be accommodated on one support which can be arranged at an angle of 45° with the principal rays of the beams 8 and 8'.

Instead of a plane-parallel plate 10 the apparatus in accordance with FIGS. 1 and 3 may employ a wedge-shaped plate 21. Such a plate is shown in FIG. 4. If the read beam reflected by the record carrier passes through the plate (compare FIG. 1) the wedge-shape has the advantage that any reflections by the back surface (12 in FIG. 1), which is not intended as a mirror, cannot become annoying, because the radiation components reflected by the back surface, both viewed at the record carrier and at the detector, are deflected sufficiently far away from the useful radiation employed for focussing detection and, as the case may be, for information reading. For introducing the same astigmatism, the average thickness of the wedge is smaller than the thickness of a plane-parallel plate.

A great advantage of a wedge in comparison with a plane-parallel plate is that the orientation of the astigmatism can be adjusted in a better way and be adapted to the composite detector 13 being used.

In an embodiment of an apparatus in accordance with FIG. 4 for which the distance between the astigmatic focal lines is approximately 10 mm, the angle of incidence i is 45°, the average thickness d of the substrate is aproximately 3 mm, the refractive index n of the substrate is approx. 1.5, and the distance between the surface 23 and the wedge 21 and the detector 13 is approximately 10 mm, the wedge angle $\alpha$ is approximately 10.5°.

For a wedge angle $\alpha$ of this order of magnitude or greater, a satisfactory separation between the incident beam 8 and the returning beam 8' can be obtained also if the surface 23 is constituted by a semitransparent mirror, so that in this case no use need be made of more expensive polarization means in the form of a polarization-sensitive splitting mirror and a $\lambda/4$ plate. At smaller wedge angles, for a satisfactory separation between the beam 8 and the beam 8', however, said polarization means will have to be used.

FIG. 5 represents an embodiment of an apparatus in which the beam-deflecting and astigmatism-introducing element is constituted by a diffraction grating 25. As is known, a diffraction grating with straight rulings will split an incident radiation beam into a zero-order subbeam, two first-order subbeams and a plurality of higher-order subbeams. The grating 25 may be formed so that of the radiation intensity reflected by the record carrier a comparatively great part, for example 40% will be contained in a first-order beam 8". The detector 13 is disposed in the path of this subbeam.

By linearly varying the grating period of the grating 25, the grating will produce an astigmatic effect. Indeed, a beam portion which passes through a grating portion with a greater grating period will be diffracted through a smaller angle than a beam portion which passes through a grating portion with a smaller grating period.

The period of the grating 25 has furthermore been selected so that the subbeams which have been diffracted during the first passage of the beam 8 through the grating are situated sufficiently far from the zero-order subbeam, so that said diffracted subbeams, after reflection by the record carrier, cannot reach the detector 13 or the radiation source 7. An advantage of the grating is that it is not sensitive to tilting.

In an embodiment of an apparatus in accordance with FIG. 5, employing a diode laser having a wavelength of approximately 800 nm as radiation source, the distance between the diode laser and the grating 25 is approx. 20 mm. The grating has a period which varies linearly from 3.9 to 4.1/µm. The distance between the diode laser and the detector 13 is approximately 2 mm, whilst the distance between the astigmatic focal lines is approximately 2 mm. The size of the image spot V' on the detector 13 is then approximately 0.2 mm.

When the focussing-error detection system is used in equipment other than read equipment, for example in microscopes or in projection systems for the manufactore of integrated circuits, this detection system operates in the same way as described for read equipment in the foregoing.

What is claimed is:

1. An optical system for detecting deviations between an image plane of an objective system and a reflective surface on which an image is to be formed by the objective system, said apparatus comprising means for producing a beam of radiation which is directed along a first path through the objective system and onto the reflective surface, at least a portion of said beam incident on said reflective surface being reflected thereby back through the objective system along a portion of said first path, means disposed in said portion of said first path for separating the reflected radiation from said beam passing along said first path towards the reflective surface, said separating means including an optical element which both diverts said radiation reflected by said reflective surface along a second path different from said first path and introduces astigmatism solely in said reflected radiation diverted along said second path, and radiation responsive means disposed in said second path for producing a signal indicative of the deviation between said image plane and said reflective surface.

2. A system as claimed in claim 1 in wherein said optical element is a diffraction grating with a linearly varying grating period.

3. A system as claimed in claim 1 wherein said optical element is a plate of a transparent material having two surfaces which are inclined relative to the principal axis of the beam and wherein one of said two surfaces is partly reflecting.

4. A system as claimed in claim 3, wherein said plate is wedge-shaped.

5. A system as claimed in claim 3 or 4, wherein the second surface of the plate is radiation-reflecting.

6. A system as claimed in claim 3 or 4, characterized wherein the partly reflecting surface of the plate is a polarization-sensitive splitting mirror.

7. A system as claimed in claim 1 wherein said radiation responsive means includes a radiation sensitive detector comprised of four sub-detectors.

8. An apparatus for reading a record carrier having a radiation reflecting information structure containing information in a form readable by a beam of radiation, said apparatus comprising means for producing a read beam of radiation, an objective system for focussing said read beam to a spot on said information structure so that the radiation is modulated by said information structure in accordance with information stored thereby, at least a portion of the modulated radiation being reflected by the information structure back through said objective system, means for separating the reflected radiation from said read beam traveling towards said record carrier, said separating means being disposed between said objective system and said beam producing means in the path traversed by said read beam and said reflected radiation and including an optical element which both diverts said reflected radiation along a second path which is different from the path traversed by said read beam traveling towards said record carrier and introduces astigmatism solely in said reflected radiation diverted along said second path, and radiation responsive means disposed in said second path, said radiation responsive means producing a signal indicative of deviation of said information structure from a predetermined position in response to variations in the shape of said second spot due to the astigmatism introduced by said optical element.

9. An apparatus as claimed in claim 8, wherein said optical element converges said reflected radiation into a pair of astigmatic focal lines each located at one of two positions spaced from each other along said second path and said radiation responsive means is disposed between said two positions.

10. An apparatus as claimed in claims 8 or 9 wherein said radiation responsive means includes a radiation sensitive detector comprised of four sub-detectors.

11. An apparatus as claimed in claim 8 wherein said optical element is a diffraction grating with a linearly varying grating period.

12. An apparatus as claimed in claim 8 wherein said optical element is a plate of transparent material having two surfaces which are inclined relative to the principal axis of the beam and wherein one of said two surfaces is partly reflecting.

13. An apparatus as claimed in claim 12 wherein said plate is wedge-shaped.

14. An apparatus as claimed in claim 12 or 13 wherein the second surface of the plate is radiation-reflecting.

15. An apparatus as claimed in claim 12 or 13 wherein the partly reflecting surface of the plate is a polarization-sensitive splitting mirror.

* * * * *